United States Patent
Shiga et al.

(10) Patent No.: US 12,555,988 B2
(45) Date of Patent: Feb. 17, 2026

(54) FEEDTHROUGH STRUCTURE AND UNDERWATER APPARATUS

(71) Applicants: NEC Corporation, Tokyo (JP); NEC Platforms, Ltd., Kawasaki (JP)

(72) Inventors: Hiroaki Shiga, Kanagawa (JP); Toshihide Nagasawa, Tokyo (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 205 days.

(21) Appl. No.: 18/437,531

(22) Filed: Feb. 9, 2024

(65) Prior Publication Data

US 2024/0283232 A1 Aug. 22, 2024

(30) Foreign Application Priority Data

Feb. 22, 2023 (JP) ................................. 2023-026770

(51) Int. Cl.
*H02G 3/08* (2006.01)
*B63G 8/00* (2006.01)

(52) U.S. Cl.
CPC ............ *H02G 3/088* (2013.01); *B63G 8/001* (2013.01); *B63G 2008/007* (2013.01)

(58) Field of Classification Search
None
See application file for complete search history.

(56) References Cited

U.S. PATENT DOCUMENTS

| | | | | |
|---|---|---|---|---|
| 3,055,972 A | * | 9/1962 | Peterson | H02G 3/0658 277/621 |
| 3,877,775 A | * | 4/1975 | Barlow | H01R 13/523 439/204 |
| 4,003,620 A | * | 1/1977 | O'Brien | H01R 13/523 439/204 |
| 4,169,965 A | * | 10/1979 | Cronin | H01B 17/26 174/31 R |
| 5,178,742 A | * | 1/1993 | Lemke | G01Q 70/16 219/69.18 |
| 5,321,221 A | * | 6/1994 | Rozier | H01H 33/127 218/2 |
| 8,901,440 B2 | * | 12/2014 | Rousseau | H01R 13/523 174/650 |
| 2020/0203881 A1 | * | 6/2020 | Marzano | H01G 4/232 |

FOREIGN PATENT DOCUMENTS

WO 2006/097972 A1 9/2006

* cited by examiner

*Primary Examiner* — Krystal Robinson
(74) *Attorney, Agent, or Firm* — Sughrue Mion, PLLC

(57) ABSTRACT

The body component and the protector component are inserted into the through hole of the end face plate. The protector component is disposed, in the through hole, at a place closer to the outer surface of the end face plate than the body component is. The body component guides a tail cable into the internal space of the pressure-resistant housing main body. The protector component protects the tail cable. The nut fixes the protector component to the end face plate. The elastic member is attached to the end face plate so as to cover the boundary part between the protector component and the nut. The insulating liquid is charged in the space between the elastic member and the protector component.

14 Claims, 2 Drawing Sheets

FEEDTHROUGH STRUCTURE AND UNDERWATER APPARATUS

INCORPORATION BY REFERENCE

This application is based upon and claims the benefit of priority from Japanese patent application No. 2023-026770, filed on Feb. 22, 2023, the disclosure of which is incorporated herein in its entirety by reference.

TECHNICAL FIELD

The present disclosure relates to a feedthrough structure and an underwater apparatus.

BACKGROUND ART

As related art, International Patent Publication No. WO2006/097972 discloses a submarine repeater. The submarine repeater includes a pressure-resistant housing with a repeater unit stored therein and a pressure-resistant housing lid disposed at both ends of the pressure-resistant housing. A feedthrough structure for connecting a submarine cable to the repeater unit is disposed in the pressure-resistant housing lid. The feedthrough structure disclosed in International Patent Publication No. WO2006/097972 includes a tail cable guide part for guiding a tail cable into the submarine repeater and a cap member attached to the tail cable guide part. The tail cable guide part, to which the cap member is attached, is inserted into an opening formed in the pressure-resistant housing lid and fixed thereto by using a nut.

In the feedthrough structure disclosed in International Patent Publication No. WO2006/097972, a rubber cap is disposed between the cap member and the tail cable. Further, a polybutene injection part for filling polybutene, which is an insulating oil, is disposed on the cap member and the polybutene is filled in a clearance formed by the rubber cap and the tail cable guide part and the tail cable guide part. The polybutene injection part is closed by a screw after the polybutene is charged therein. The rubber cap and the tail cable are strapped with a tape, so that seawater is prevented from entering through the clearance between the rubber cap and the tail cable.

However, in the feedthrough structure disclosed in International Publication No. 2006/097972, no consideration is given to the fact that seawater could enter through the boundary part between the feedthrough structure and the pressure-resistant housing lid. If seawater enters from this part, the seawater may reach the boundary between the tail cable guide part and the pressure-resistant housing lid. Therefore, there is a demand for a feedthrough structure having improved water-tightness.

SUMMARY

In view of the above-described circumstances, an object of the present disclosure is to provide a feedthrough structure and an underwater apparatus capable of improving water-tightness in feedthrough.

To achieve the above-described object, in a first aspect, the present disclosure provides a feedthrough structure. The feedthrough structure includes: a body component inserted in a through hole formed in an end face plate of a pressure-resistant housing, and configured to guide a tail cable into an internal space of the pressure-resistant housing; a protector component disposed in the through-hole at a place closer to an outer surface of the end face plate than the body component is, and configured to protect the tail cable; a nut configured to fix the protector component to the end face plate; a first elastic member attached to the end face plate so as to cover a boundary part between the protector component and the nut; and an insulating liquid charged in a space between the first elastic member and the protector component.

In a second aspect, the present disclosure provides an underwater apparatus. The underwater apparatus includes: a pressure-resistant housing main body with an opening formed at least one end thereof, the pressure-resistant housing main body including an internal space; at least one end face plate with a through hole formed therein, disposed in the opening; an internal unit disposed in the internal space; and a feedthrough structure inserted in the through-hole. The feedthrough structure includes: a body component inserted in the through-hole of the end face plate, and configured to guide a tail cable into an internal space of the pressure-resistant housing; a protector component disposed in the through-hole at a place closer to an outer surface of the end face plate than the body component is, and configured to protect the tail cable; a nut configured to fix the protector component to the end face plate; a first elastic member attached to the end face plate so as to cover a boundary part between the protector component and the nut; and an insulating liquid charged in a space between the first elastic member and the protector component.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
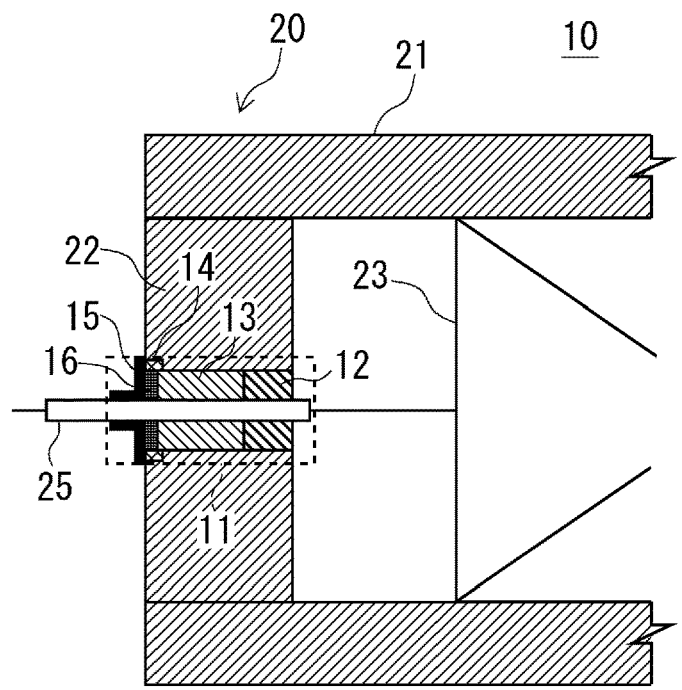
FIG. 1 is a cross-sectional diagram showing a schematic configuration of an underwater apparatus according to the present disclosure.

Prior to describing the present disclosure, an outline of the present disclosure will be described. FIG. 1 shows a schematic configuration of an underwater apparatus according to the present disclosure. The underwater apparatus 10 includes a pressure-resistant housing main body 21, at least one end face plate 22, an internal unit 23, and a feedthrough structure 11. An opening is formed at least one end of the pressure-resistant housing main body 21, and it includes an internal space. The end face plate 22 is disposed in the opening. A through hole is formed in the end face plate 22. The internal unit 23 is disposed in the internal space of the pressure-resistant housing main body 21. The feedthrough structure 11 is inserted into the through hole of the end face plate 22.

The feedthrough structure 11 includes a body component 12, a protector component 13, a nut 14, an elastic member 15, and an insulating liquid 16. The body component 12 and the protector component 13 are inserted into the through hole of the end face plate 22. The protector component 13 included in the through hole is disposed at a place closer to the outer surface of the end face plate 22 than the body component 12 is.

The body component 12 guides a tail cable 25 into the internal space of the pressure-resistant housing main body 21. The protector component 13 protects the tail cable 25. The nut 14 fixes the protector component 13 to the end face plate 22. The elastic member 15 is attached to the end face plate 22 so as to cover the boundary part between the protector component 13 and the nut 14. The insulating liquid 16 is charged in the space between the elastic member 15 and the protector component 13.

In the present disclosure, the elastic member 15 covers the boundary part between the protector component 13 and the nut 14. Further, the insulating liquid 16 is charged in the space between the elastic member 15 and the protector component 13. In this way, it is possible to prevent water from entering from the boundary part between the protector component 13 and the nut 14, and thereby to improve water-tightness in the feedthrough.

An example embodiment according to the present disclosure will be described hereinafter in detail with reference to the drawings. Note that to clarify the following description, some of the parts thereof and some of the drawings have been omitted or simplified. Further, the same and similar elements are assigned the same reference numerals (or symbols) throughout the drawings, and redundant descriptions thereof are omitted as appropriate.

Figure 2:
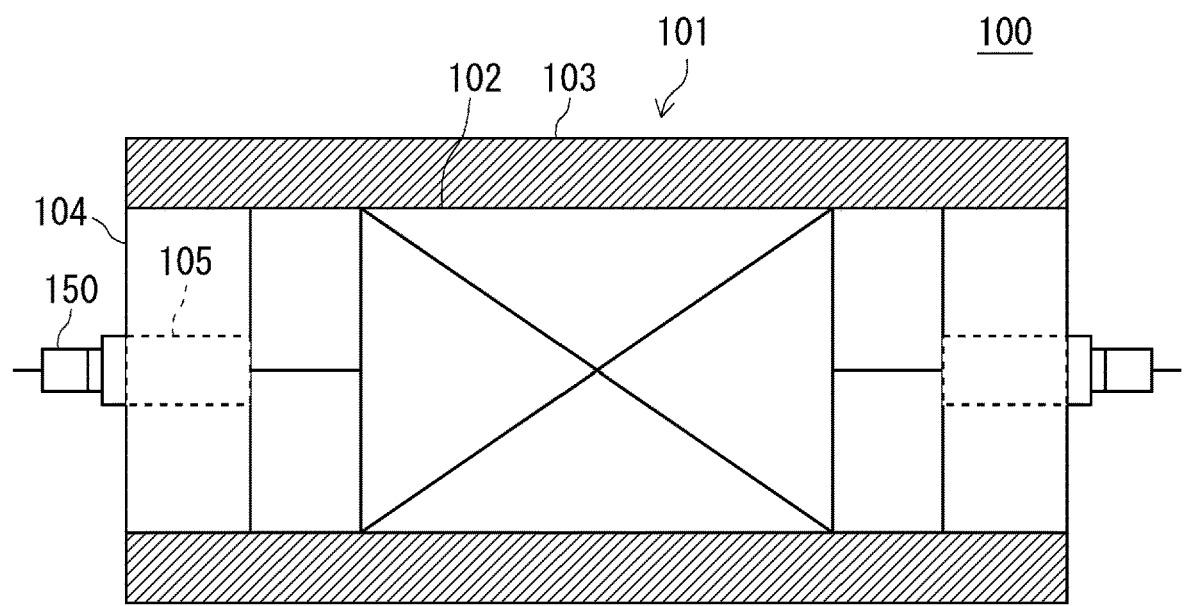
FIG. 2 is a cross-sectional diagram showing an example of a configuration of an underwater apparatus according to an example embodiment of the present disclosure.

FIG. 2 shows a cross section of an underwater apparatus according to an example embodiment of the present disclosure. In this example embodiment, the underwater apparatus 100 is configured as a submarine apparatus disposed, for example, under the sea. The underwater apparatus 100 includes a pressure-resistant housing 101 and an internal unit 102. The underwater apparatus 100 corresponds to the underwater apparatus 10 shown in FIG. 1. The pressure-resistant housing 101 corresponds to the pressure-resistant housing 20 shown in FIG. 1. The internal unit 102 corresponds to the internal unit 23 shown in FIG. 1.

The pressure-resistant housing 101 includes a hollow cylindrical pressure-resistant housing main body 103 and two end face plates 104. Each of the end face plates 104 is formed in a solid cylindrical shape, and they close the opened ends of the pressure-resistant housing main body 103. The end face plate 104 (i.e., each of the end face plates 104) includes a feedthrough structure 105 for drawing (i.e., inserting) a cable, which is connected to a tail cable 150, therethrough into the pressure-resistant housing main body 103. The end face plate 104 is also referred to as a pressure-resistant housing cover. The pressure-resistant housing main body 103 corresponds to the pressure-resistant housing main body 21 shown in FIG. 1. The end face plate 104 corresponds to the end face plate 22 shown in FIG. 1. The tail cable 150 corresponds to the tail cable 25 shown in FIG. 1.

The internal unit 102 is housed in the internal space of the pressure-resistant housing main body 103. The internal unit 102 includes an electric circuit for providing a predetermined function in the underwater apparatus 100. For example, when the underwater apparatus 100 is used as a repeater for a submarine cable through which an optical signal propagates, the internal unit 102 includes an optical signal amplifier that amplifies the optical signal. The tail cable 150 is connected to the internal unit 102 through the feedthrough structure 105. The tail cable 150 includes, for example, an electric wiring line and an optical cable. The internal unit 102 operates on electric power supplied through the electric wiring line of the tail cable 150. Further, the internal unit 102 amplifies an optical signal supplied through the optical fiber of the tail cable 150.

Figure 3:
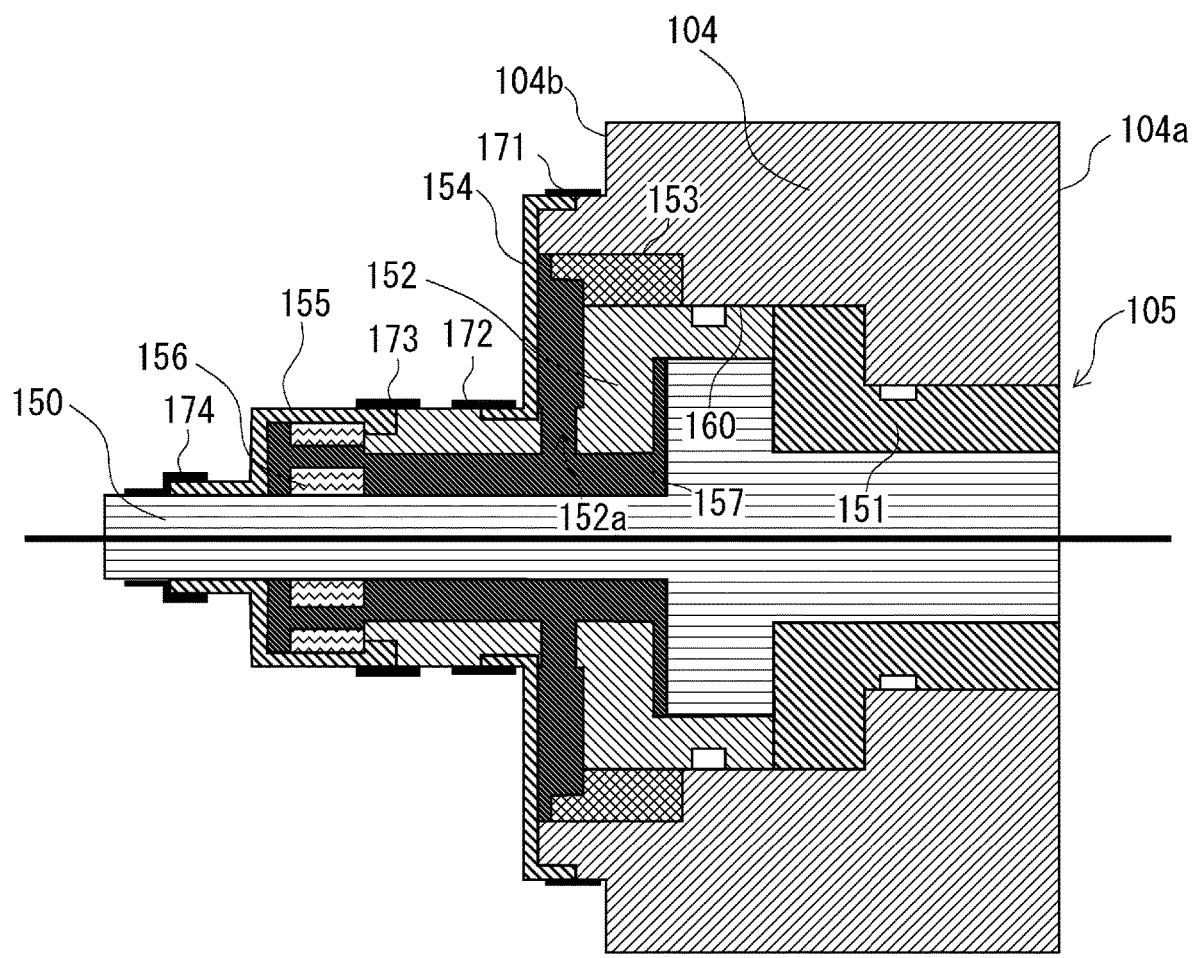
FIG. 3 is a cross-sectional diagram showing a feedthrough structure.

FIG. 3 shows the feedthrough structure 105. The feedthrough structure 105 includes a body component 151, a protector component 152, a ground nut 153, a first elastic member 154, a second elastic member 155, and a holder 156. The feedthrough structure 105 corresponds to the feedthrough structure 11 shown in FIG. 1. In the feedthrough structure 105, each of the body component 151, the protector component 152, the ground nut 153, and the holder 156 is formed by using, for example, a metal material.

The end face plate 104 (i.e., each of the end face plates) has an inner surface 104a which defines the internal space of the pressure-resistant housing 101 (see FIG. 2) and an outer surface 104b which faces in the opposite direction to the inner surface 104a. The outer surface 104b is a surface to which a high pressure is applied when the underwater apparatus is installed under water such as on the seabed. A through hole 160 extending in the axial direction of the pressure-resistant housing 101 is formed in the end face plate 104. In the following description, the "axial direction" means the axial direction of the pressure-resistant housing 101. Further, the "radial direction" means the radial direction of the pressure-resistant housing 101. The through hole 160 is opened in the inner surface 104a and in the outer surface 104b.

The body component 151 and the protector component 152 are disposed inside the through hole 160 of the end face plate 104. Each of the body component 151 and the protector component 152 has a through hole inside which the tail cable 150 is housed. In each of the body component 151 and the protector component 152, a recessed part may be formed in the circumferential direction (i.e., formed along the circumference direction), and an O-ring having an annular shape may be formed in this recessed part. The body component 151 correspond to the body component 12 shown in FIG. 1. The protector component 152 correspond to the protector component 13 shown in FIG. 1.

The tail cable 150 includes, for example, a center conductor and a resin covering the center conductor. The center conductor is also referred to as a feeding tube. The center conductor may be, for example, a metal pipe inside which an optical fiber and an electric wiring line are disposed. In the through hole 160, the protector component 152 is disposed on a higher-pressure side than the body component 151 is, i.e., on the side of the outer surface 104b. The ground nut 153 is used to fix the body component 151 and the protector component 152 to the end face plate 104 in the through hole 160. The ground nut 153 corresponds to the nut 14 shown in FIG. 1.

The first elastic member 154 has one end attached to the end face plate 104 and the other end attached to the protector component 152. The outer surface 104b of the end face plate 104 includes a projecting part around the through hole 160. A step the height of which corresponds to the thickness of the first elastic member 154 is formed on the wall of the projecting part formed on the outer surface 104b, and the one end of the first elastic member 154 is disposed in this step. The tape 171 fixes the end face plate 104 and the first elastic member 154 on the one end side of the first elastic member 154 in a water-tight manner. Further, a recessed part the depth of which corresponds to the thickness of the first elastic member 154 is formed in the protector component 152, and the other end of the first elastic member 154 is disposed in the recessed part. The tape 172 fixes the protector component 152 and the first elastic member 154 on the other end side of the first elastic member 154 in a water-tight manner. The first elastic member 154 covers the boundary part between the through hole 160 of the end face plate 104 and the feedthrough structure 105. More specifically, the first elastic member 154 covers the boundary part between the ground nut 153 and the end face plate 104. The first elastic member 154 corresponds to the elastic member 15 shown in FIG. 1.

The second elastic member 155 has one end attached to the protector component 152 and the other end attached to the tail cable 150. A step the height of which corresponds to the thickness of the second elastic member 155 is formed in the protector component 152, and the one end of the second elastic member 155 is disposed in this step. The tape 173 fixes the protector component 152 and the second elastic member 155 in the one end side of the second elastic member 155 in a water-tight manner. Further, the tape 174 fixes the tail cable 150 and the second elastic member 155 on the other end side of the second elastic member 155 in a water-tight manner. Each of the first elastic member 154 and the second elastic member 155 is formed of, for example, a rubber material. Each of the first elastic member 154 and the second elastic member 155 is also called a rubber cap.

The holder 156 holds the tail cable 150 so that the center conductor of the tail cable 150 passes at or near the center of the through hole of the end face plate 104. The holder 156 is used for ensuring the strength of and thereby protecting the connecting part of the tail cable 150 in the feedthrough structure. The holder 156 is formed from, for example, two semicircular components, and a hole through which the tail cable 150 passes is formed in the central part thereof. The two semicircular components of the holder 156 are attached to the protector component 152 by, for example, screws so as to sandwich the tail cable 150 therebetween. The protector component 152 and the holder 156 hold the tail cable 50 in such a manner that bending and stretching, which occur when, for example, the tail cable 150 is moved, is not transmitted to the body component 151 disposed therein.

Inside the holder 156, a hole for transmitting an insulating liquid 157 (i.e., for allowing an insulating liquid 157 to flow therethrough) in the direction of the protector component 152 is formed. For example, before the second elastic member 155 is fixed, the space between the tail cable 150 and the protector component 152 is filled with the insulating liquid 157 through the hole formed in the holder 156. The insulating liquid 157 is typically an insulating oil or a fluorine-based inert liquid. Further, in the protector component 152, holes 152*a* are formed at several places along the radial direction. The holes 152*a* allow the insulating liquid 157 charged in the space between the protector component 152 and the tail cable 150 to pass therethrough in the direction of the boundary part between the protector component 152 and the ground nut 153. The insulating liquid 157 corresponds to the insulating liquid 16 shown in FIG. 1. After the insulating liquid 157 is charged, the second elastic member 155 is fixed to the tail cable 150 and the protector component 152.

Note that, in general, the body component 151, the protector component 152, and the ground nut 153 of the feedthrough structure 105, and the end face plate 104 are formed of the same metal material. For example, a copper-based metal is used for these components. However, in recent years, it is becoming difficult to procure such a metal used for these parts, and there has been a demand for an alternative material(s) in view of cost reduction, demands from customers, and improvement in manufacturing. In such a case, a copper-based metal (a first metal material) may be used for the body component 151, and a new material (a second metal material) such as a stainless-steel alloy or a titanium alloy may be used for the protector component 152, the ground nut 153, and the end face plates 104. However, in such a structure, the contact surface between different types of metals may be eroded by water or seawater, so that different-type metal corrosion (e.g., bimetallic corrosion) may occur. As a standard design for a submarine repeater, it is required that the submarine repeater should have corrosion resistance in seawater, so there is a demand for a structural design for preventing corrosion.

In this example embodiment, the boundary between the protector component 152 and the ground nut 153 is covered by the first elastic member 154, and the space between the first elastic member 154 and the protector component 152, and between the first elastic member 154 and the ground nut 153 is filled with an insulating liquid 157. By adopting the above-described configuration, water such as seawater is prevented from entering the boundary part between the through hole 160 of the end face plate 104 and the feedthrough structure 105, i.e., the boundary part between the end face plate 104 and the ground nut 153. Further, in this example embodiment, the boundary between the tail cable 150 and the protector component 152 is covered with the second elastic member 155, and the space between the second elastic member 155 and the protector component 152 is filled with the insulating liquid 157. By adopting the above-described configuration, water such as seawater is prevented from entering the boundary part between the tail cable 150 and the feedthrough structure 105.

In this example embodiment, it is possible to prevent water from entering the boundary part between the through hole 160 of the end face plate 104 and the feedthrough structure 105. Therefore, in this example embodiment, it is possible to prevent seawater from entering the boundary part between the through hole 160 of the end face plate 104 and the feedthrough structure 105, and thereby prevent water from, after entering the boundary part, reaching the body component 151. Therefore, in this example embodiment, even when different metal materials are used for the body component 151, the protector component 152, the ground nut 153, and the end face plate 104, it is still possible to prevent seawater from entering the surface in which the different types of metals are contact with each other, and thereby to prevent the occurrence of corrosion.

The feedthrough structure and the underwater apparatus according to the present disclosure can improve water-tightness in feedthrough.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

For example, some or all of the above-described example embodiments may be described as the following supplementary notes, but are not limited to the following.

[Supplementary Note 1]

1. A feedthrough structure including:
    a body component inserted in a through hole formed in an end face plate of a pressure-resistant housing, and configured to guide a tail cable into an internal space of the pressure-resistant housing;
    a protector component disposed in the through-hole at a place closer to an outer surface of the end face plate than the body component is, and configured to protect the tail cable;

a nut configured to fix the protector component to the end face plate;
a first elastic member attached to the end face plate so as to cover a boundary part between the protector component and the nut; and
an insulating liquid charged in a space between the first elastic member and the protector component.

[Supplementary Note 2]

The feedthrough structure according to Supplementary note 1, wherein one end of the first elastic member is fixed to the end face plate in a water-tight manner by using tape, and the other end of the first elastic member is fixed to the protector component in a water-tight manner by using tape.

[Supplementary Note 3]

The feedthrough structure according to Supplementary note 1 or 2, wherein the body component is formed by using a first metal material, and the protector component, the nut, and the end face plate are formed by using a second metal material different from the first metal material.

[Supplementary Note 4]

The feedthrough structure according to Supplementary note 1 or 2, further including a second elastic member configured to fix the tail cable and the protector component in a water-tight manner.

[Supplementary Note 5]

The feedthrough structure according to Supplementary note 4, further including a holder configured to hold the tail cable between the second elastic member and the protector component.

[Supplementary Note 6]

The feedthrough structure according to Supplementary note 1 or 2, wherein the insulating liquid is also charged in a space between the protector component and the tail cable.

[Supplementary Note 7]

The feedthrough structure according to Supplementary note 6, wherein
one or more holes are formed in the protector component, the one or more holes being configured to connect the space between the protector component and the tail cable and the space between the first elastic member and the protector component, and
the insulating liquid is charged, through the one or more holes, into the space between the first elastic member and the protector component and the space between the protector component and the tail cable.

[Supplementary Note 8]

An underwater apparatus including:
a pressure-resistant housing main body with an opening formed at least one end thereof, the pressure-resistant housing main body including an internal space;
at least one end face plate with a through hole formed therein, disposed in the opening;
an internal unit disposed in the internal space; and
a feedthrough structure inserted in the through-hole, wherein
the feedthrough structure includes:
a body component inserted in the through-hole of the end face plate, and configured to guide a tail cable into an internal space of the pressure-resistant housing;
a protector component disposed in the through-hole at a place closer to an outer surface of the end face plate than the body component is, and configured to protect the tail cable;
a nut configured to fix the protector component to the end face plate;
a first elastic member attached to the end face plate so as to cover a boundary part between the protector component and the nut; and
an insulating liquid charged in a space between the first elastic member and the protector component.

[Supplementary Note 9]

The underwater apparatus according to Supplementary note 8, wherein one end of the first elastic member is fixed to the end face plate in a water-tight manner by using tape, and the other end of the first elastic member is fixed to the protector component in a water-tight manner by using tape.

[Supplementary Note 10]

The underwater apparatus according to Supplementary note 8, wherein the body component is formed by using a first metal material, and the protector component, the nut, and the end face plate are formed by using a metal material different from the first metal material.

[Supplementary Note 11]

The underwater apparatus according to Supplementary note 8, further including a second elastic member configured to fix the tail cable and the protector component in a water-tight manner.

[Supplementary Note 12]

The underwater apparatus according to Supplementary note 11, further including a holder configured to hold the tail cable between the second elastic member and the protector component.

[Supplementary Note 13]

The underwater apparatus according to Supplementary note 8, wherein the insulating liquid is also charged in a space between the protector component and the tail cable.

[Supplementary Note 14]

The underwater apparatus according to Supplementary note 13, wherein
the protector component includes a hole configured to connect the space between the protector component and the tail cable and the space between the first elastic member and the protector component, and
the insulating liquid is charged, through the hole, into the space between the first elastic member and the protector component and the space between the protector component and the tail cable.

What is claimed is:

1. A feedthrough structure comprising:
a body component inserted in a through hole formed in an end face plate of a pressure-resistant housing, and configured to guide a tail cable into an internal space of the pressure-resistant housing;
a protector component disposed in the through-hole at a place closer to an outer surface of the end face plate than the body component is, and configured to protect the tail cable;
a nut configured to fix the protector component to the end face plate;
a first elastic member attached to the end face plate so as to cover a boundary part between the protector component and the nut; and
an insulating liquid charged in a space between the first elastic member and the protector component.

2. The feedthrough structure according to claim 1, wherein one end of the first elastic member is fixed to the end face plate in a water-tight manner by using tape, and the other end of the first elastic member is fixed to the protector component in a water-tight manner by using tape.

3. The feedthrough structure according to claim 1, wherein the body component is formed by using a first metal material, and the protector component, the nut, and the end face plate are formed by using a second metal material different from the first metal material.

4. The feedthrough structure according to claim 1, further comprising a second elastic member configured to fix the tail cable and the protector component in a water-tight manner.

5. The feedthrough structure according to claim 4, further comprising a holder configured to hold the tail cable between the second elastic member and the protector component.

6. The feedthrough structure according to claim 1, wherein the insulating liquid is also charged in a space between the protector component and the tail cable.

7. The feedthrough structure according to claim 6, wherein
one or more holes are formed in the protector component, the one or more holes being configured to connect the space between the protector component and the tail cable and the space between the first elastic member and the protector component, and
the insulating liquid is charged, through the one or more holes, into the space between the first elastic member and the protector component and the space between the protector component and the tail cable.

8. An underwater apparatus comprising:
a pressure-resistant housing main body with an opening formed at least one end thereof, the pressure-resistant housing main body including an internal space;
at least one end face plate with a through hole formed therein, disposed in the opening;
an internal unit disposed in the internal space; and
a feedthrough structure inserted in the through-hole, wherein
the feedthrough structure comprises:
a body component inserted in the through-hole of the end face plate, and configured to guide a tail cable into an internal space of the pressure-resistant housing;
a protector component disposed in the through-hole at a place closer to an outer surface of the end face plate than the body component is, and configured to protect the tail cable;
a nut configured to fix the protector component to the end face plate;
a first elastic member attached to the end face plate so as to cover a boundary part between the protector component and the nut; and
an insulating liquid charged in a space between the first elastic member and the protector component.

9. The underwater apparatus according to claim 8, wherein one end of the first elastic member is fixed to the end face plate in a water-tight manner by using tape, and the other end of the first elastic member is fixed to the protector component in a water-tight manner by using tape.

10. The underwater apparatus according to claim 8, wherein the body component is formed by using a first metal material, and the protector component, the nut, and the end face plate are formed by using a metal material different from the first metal material.

11. The underwater apparatus according to claim 8, further comprising a second elastic member configured to fix the tail cable and the protector component in a water-tight manner.

12. The underwater apparatus according to claim 11, further comprising a holder configured to hold the tail cable between the second elastic member and the protector component.

13. The underwater apparatus according to claim 8, wherein the insulating liquid is also charged in a space between the protector component and the tail cable.

14. The underwater apparatus according to claim 13, wherein
the protector component includes a hole configured to connect the space between the protector component and the tail cable and the space between the first elastic member and the protector component, and
the insulating liquid is charged, through the hole, into the space between the first elastic member and the protector component and the space between the protector component and the tail cable.

* * * * *